United States Patent
Ross et al.

(10) Patent No.: US 9,332,056 B2
(45) Date of Patent: May 3, 2016

(54) METHODS AND APPARATUS TO DISTINGUISH BETWEEN PARENT AND CHILD WEBPAGE ACCESSES AND/OR BROWSER TABS IN FOCUS

(71) Applicant: The Nielsen Company (US), LLC, New York, NY (US)

(72) Inventors: Scott Ross, Austin, TX (US); Vianney Dervaux, Dublin, CA (US); Binlay Low, Saratoga, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 13/953,176

(22) Filed: Jul. 29, 2013

(65) Prior Publication Data
US 2014/0019589 A1 Jan. 16, 2014

Related U.S. Application Data

(63) Continuation of application No. 12/895,288, filed on Sep. 30, 2010, now Pat. No. 8,499,065.

(51) Int. Cl.
*H04L 29/08* (2006.01)
*G06F 11/34* (2006.01)
*G06Q 30/02* (2012.01)
*H04L 12/26* (2006.01)
*G06F 17/30* (2006.01)

(52) U.S. Cl.
CPC ............ *H04L 67/02* (2013.01); *G06F 11/3438* (2013.01); *G06F 11/3476* (2013.01); *G06F 11/3495* (2013.01); *G06F 17/30861* (2013.01); *G06Q 30/0226* (2013.01); *H04L 43/062* (2013.01); *G06F 17/3089* (2013.01); *G06F 17/30873* (2013.01); *G06F 2201/875* (2013.01)

(58) Field of Classification Search
USPC .......................... 709/223, 224, 203, 217, 219
See application file for complete search history.

(56) References Cited

U.S. PATENT DOCUMENTS

| 5,796,952 | A | 8/1998 | Davis et al. |
| 5,862,325 | A | 1/1999 | Reed et al. |
| 6,138,155 | A | 10/2000 | Davis et al. |
| 6,286,046 | B1 | 9/2001 | Dryant |
| 6,411,998 | B1 * | 6/2002 | Bryant .................... H04L 29/06 370/216 |
| 6,611,835 | B1 | 8/2003 | Huang et al. |
| 6,708,215 | B1 | 3/2004 | Hingorani et al. |

(Continued)

OTHER PUBLICATIONS

United States Patent and Trademark Office, "Non-Final Office Action," issued in connection with U.S. Appl. No. 12/895,288, on Jul. 5, 2012 (12 pages).

(Continued)

*Primary Examiner* — Lashonda Jacobs
(74) *Attorney, Agent, or Firm* — Hanley, Flight & Zimmerman, LLC

(57) ABSTRACT

Methods and apparatus to distinguish between parent and child webpage accesses and/or browser tabs in focus are disclosed. An example implementation includes identifying an HTTP request; retrieving Page Info data from a browser; electronically detecting if the Page Info data and the HTTP request identify a same Internet resource; electronically classifying the HTTP request as a parent call when the Page Info data and the HTTP request identify the same Internet resource; and electronically classifying the HTTP request as a child call when the Page Info data and the HTTP request identify different Internet resources.

12 Claims, 9 Drawing Sheets

(56) References Cited

U.S. PATENT DOCUMENTS

| | | | |
|---|---|---|---|
| 6,763,386 B2 | 7/2004 | Davis et al. | |
| 6,851,060 B1* | 2/2005 | Shrader | G06F 17/30861 |
| | | | 707/999.009 |
| 6,931,397 B1 | 8/2005 | Sundaresan | |
| 7,216,149 B1 | 5/2007 | Briscoe et al. | |
| 7,237,192 B1* | 6/2007 | Stephenson | G06F 17/212 |
| | | | 715/210 |
| 7,475,352 B2 | 1/2009 | Yolleck et al. | |
| 7,523,409 B2 | 4/2009 | Yolleck et al. | |
| 7,600,014 B2 | 10/2009 | Russell et al. | |
| 8,020,083 B1 | 9/2011 | Kembel | |
| 8,028,059 B1* | 9/2011 | O'Laughlen | G06F 17/30702 |
| | | | 709/223 |
| 8,078,691 B2 | 12/2011 | Zhang et al. | |
| 8,191,007 B1 | 5/2012 | Veloz, III | |
| 8,499,065 B2 | 7/2013 | Ross et al. | |
| 8,892,635 B2* | 11/2014 | Sullivan | 709/203 |
| 9,015,226 B2* | 4/2015 | Sullivan | G06F 17/30861 |
| | | | 709/203 |
| 2002/0038349 A1 | 3/2002 | Perla et al. | |
| 2002/0120727 A1* | 8/2002 | Curley | H04L 41/12 |
| | | | 709/223 |
| 2002/0143933 A1 | 10/2002 | Hind et al. | |
| 2003/0131052 A1* | 7/2003 | Allan | H04L 29/06 |
| | | | 709/203 |
| 2003/0187677 A1 | 10/2003 | Malireddy et al. | |
| 2003/0225858 A1* | 12/2003 | Keohane | G06F 17/30855 |
| | | | 709/218 |
| 2005/0091510 A1* | 4/2005 | McKeon | G06F 9/4443 |
| | | | 713/185 |
| 2006/0212792 A1 | 9/2006 | White et al. | |
| 2006/0265416 A1 | 11/2006 | Seki et al. | |
| 2007/0162448 A1 | 7/2007 | Jain et al. | |
| 2007/0260589 A1* | 11/2007 | Yugami | G06F 11/3447 |
| 2007/0271375 A1 | 11/2007 | Hwang | |
| 2008/0005686 A1 | 1/2008 | Singh | |
| 2008/0046562 A1 | 2/2008 | Butler | |
| 2009/0106769 A1* | 4/2009 | Nakamura | G06F 9/44521 |
| | | | 719/311 |
| 2009/0177768 A1 | 7/2009 | Kind et al. | |
| 2009/0271514 A1* | 10/2009 | Thomas | G06F 11/3438 |
| | | | 709/224 |
| 2009/0327947 A1* | 12/2009 | Schreiner | G06F 3/0483 |
| | | | 715/777 |
| 2009/0328063 A1 | 12/2009 | Corvera et al. | |
| 2010/0031153 A1* | 2/2010 | Ortwein | G06F 9/542 |
| | | | 715/733 |
| 2010/0077092 A1 | 3/2010 | Akaboshi | |
| 2010/0131835 A1 | 5/2010 | Kumar et al. | |
| 2010/0185940 A1 | 7/2010 | Popp et al. | |
| 2011/0041090 A1 | 2/2011 | Seolas et al. | |
| 2011/0078703 A1 | 3/2011 | Dokovski et al. | |
| 2011/0082984 A1 | 4/2011 | Yuan | |
| 2011/0202888 A1 | 8/2011 | Rusu et al. | |
| 2011/0251902 A1 | 10/2011 | Nagarajayya | |
| 2012/0030338 A1 | 2/2012 | Zhang et al. | |
| 2012/0059696 A1 | 3/2012 | Theberge et al. | |
| 2012/0066378 A1 | 3/2012 | Lui et al. | |
| 2012/0179743 A1* | 7/2012 | Sullivan | G06F 17/30861 |
| | | | 709/203 |
| 2014/0068411 A1 | 3/2014 | Ross et al. | |

OTHER PUBLICATIONS

United States Patent and Trademark Office, "Notice of Allowance," issued in connection with U.S. Appl. No. 12/895,288, on Mar. 29, 2013 (11 pages).

United States Patent and Trademark Office, "Non-Final Office Action", issued in connection with U.S. Appl. No. 13/630,818, dated Nov. 24, 2014 (24 pages).

Page Info Interface through Programming W3C.pdf, published 2010, https://web.archive.org/web/201 003271 72250/http://www.w3.org/standards/webdesig n/script. Html (3 pages).

United States Patent and Trademark Office, "Final Office Action", issued in connection with U.S. Appl. No. 13/630,818, dated Apr. 9, 2015 (30 pages).

United States Patent and Trademark Office, "Non-Final Office Action", issued in connection with U.S. Appl. No. 13/630,818, dated Sep. 16, 2015 (44 pages).

* cited by examiner

METHODS AND APPARATUS TO DISTINGUISH BETWEEN PARENT AND CHILD WEBPAGE ACCESSES AND/OR BROWSER TABS IN FOCUS

RELATED APPLICATION

This patent is a continuation of U.S. patent application Ser. No. 12/895,288, entitled "METHODS AND APPARATUS TO DISTINGUISH BETWEEN PARENT AND CHILD WEBPAGE ACCESSES AND/OR BROWSER TABS IN FOCUS," filed on Sep. 30, 2010, and granted as U.S. Pat. No. 8,499,065 on Jul. 30, 2013, which is herebyr incorporated herein by reference in its entirety.

TECHNICAL FIELD

The present disclosure pertains to Internet usage monitoring and, more specifically to, methods and apparatus to distinguish between parent and child webpage accesses and/or browser tabs in focus.

BACKGROUND

Companies that advertise their products or services on the Internet have an interest in determining how users consume their advertisements. Internet monitoring can be achieved in a number of ways. For example, monitoring can be performed at the client-side to monitor user activities. Alternatively, monitoring can be performed at the server-side to track and/or count served webpages.

DETAILED DESCRIPTION

Figure 1:
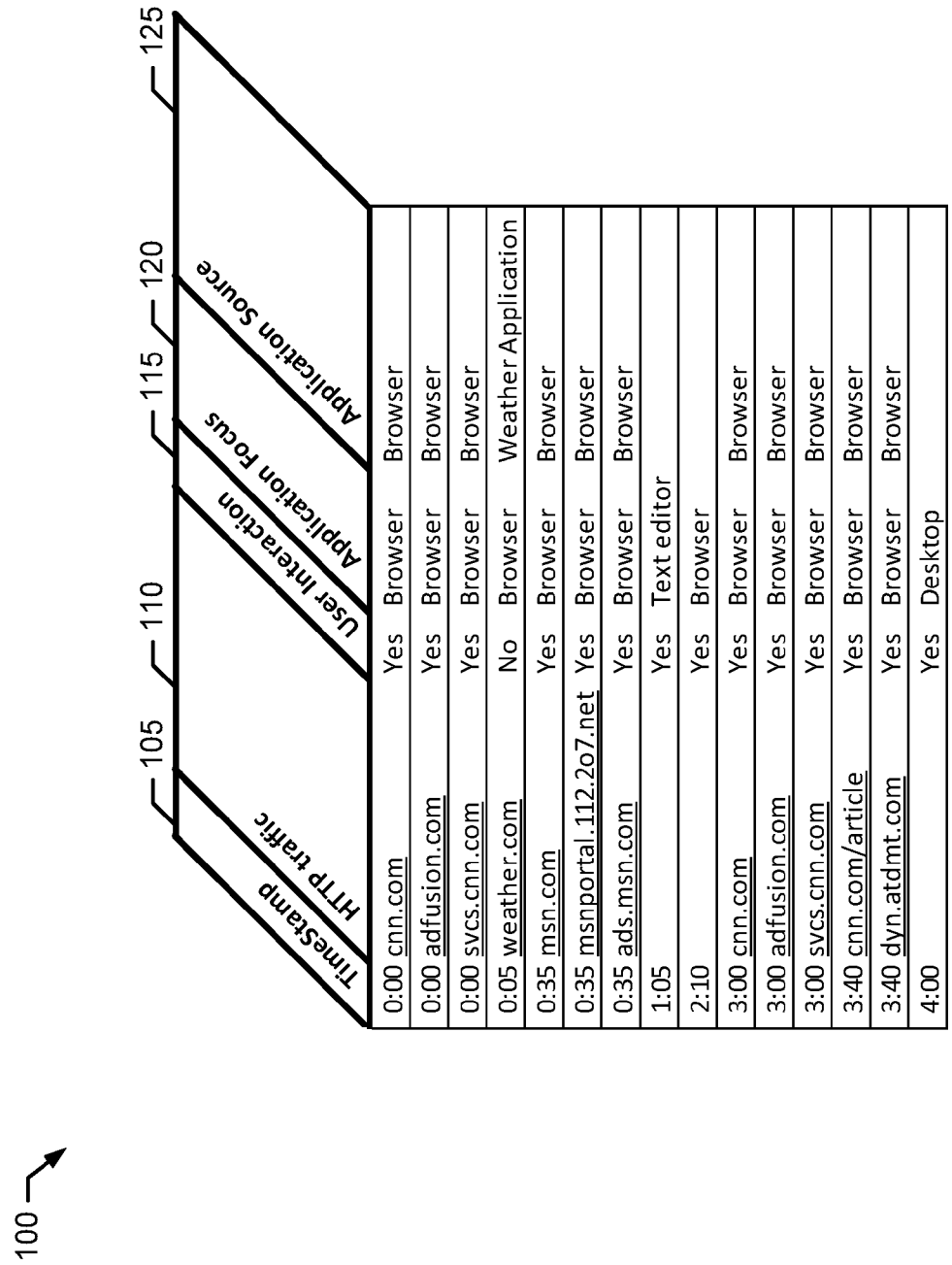
FIG. 1 illustrates a known transaction log of computer interaction and browsing events.

Internet monitoring systems may be implemented in various configurations based on the data that is intended to be collected. For example, a server hosting a server-based Internet monitoring system tracks how users interact with that server. The resulting server-based monitoring data includes detailed information about how users utilize the server, but will not provide data on how the users interact with other servers. Proxy server based Internet monitoring systems track how a group of users interact with a plurality of servers hosting various websites. For example, an Internet service provider that manages a proxy server to serve web pages may utilize the proxy server to monitor what websites users utilizing the proxy visit while using the Internet service. Client-side Internet monitoring systems monitor the Internet activity of a specific user who is operating a browser on a client computer. In such client-side Internet monitoring systems, monitoring data that is collected by the system can be very detailed due to higher levels of available processing power, the ability to monitor system calls and/or applications (e.g., a browser, a word processing program) being run locally on the client computer, the ability to track interactions with input devices (e.g., mouse clicks and/or movements, keystrokes on a keypad, etc.), the ability to detect access to cached content (e.g., a previously loaded webpage accessed from memory rather than from a fresh request to the Internet), and/or the ability to identify the user associated with the client device. Client-side monitoring thereby allows a wide range of web sites to be monitored while adding the ability to associate web usage data with specific users, groups of users and/or demographic; and allows collecting of more parameters and/or accurate monitoring data.

A browser is used to view Internet content on a client computer. To obtain web content, the browser sends an HTTP (Hypertext Transfer Protocol) request for the web content to a server at an Internet address specified by a Universal Resource Locator (URL). The server sends a response containing the web content and/or links to the web content to the browser. The browser then proceeds to render the content for presentation (e.g., display) to the user. The user may then interact with the browser and/or the content being rendered. The browser can be any Internet browsing application. For example, the browser may be Microsoft Internet Explorer®, Mozilla Firefox®, Apple Safari®, Google Chrome™, etc. Additionally or alternatively, the user may utilize multiple browsers simultaneously to view multiple web pages. Further, the browser may not be a standard Internet browser as listed above, rather the browser may be integrated into another application on the user's computer.

Users typically view content (which may include one or more webpages) in a browser for a given time period. This period is known as a browsing session. Browsing sessions can be any duration. For example, a user may use their browser to check a weather forecast on a first webpage, during a browsing session that may only last a few minutes, or even a matter of seconds. If, instead, the user accesses the weather on the first webpage and then reads a long article or series of articles on one or more other webpages, the duration of the browsing session may be many minutes or even over an hour. In the examples illustrated herein, a browsing session is defined as the time period that the browser was running irrespective of how many webpages are accessed during the time period. The user may start the browsing session by, for example, starting the browser, and may terminate the browsing session by, for example, exiting the browser.

Client-side monitoring of Hypertext Transfer Protocol (HTTP) traffic generated by a user is performed in order to determine the user's web usage habits, and can be beneficial to media monitoring and advertising companies. HTTP monitoring data typically includes the identity of web pages viewed by the user, and an indication of the time(s) that the user viewed the web pages (e.g., a timestamp(s)).

Previously, web pages were viewed in a linear fashion. In other words, users traversed from a single web page in a first domain (e.g., www.amazon.com) to another single web page in a second domain (e.g., www.nielsen.com) (e.g., by clicking on a link, typing a Universal Resource Locator (URL) into an address bar, etc.) Determining the URL of a page viewed by a user could be accomplished by monitoring the web traffic (e.g., the initial request generated by the browser over HTTP in response to a user request, etc.) Each new page traversal signified the end of the viewing duration of the previous page. Additionally or alternatively, durations of time may be assigned to web pages based on timestamps of HTTP requests.

Web page complexity has increased to facilitate richer and/or more interactive experiences for viewers. The traditional web page (referred to herein as a "parent call") represented a text/html call which included text and contained additional image references (both advertisements and pictures). Technologies such as Flash, Javascript, and i-frames have made it easier for publishers to embed elements (e.g., videos, maps, music players, other 'widgets', etc) as well as to update content in one area of the page instead of refreshing the entire page (both instances referred to herein as "child calls"). In addition, the proliferation of i-frames within site design, while allowing web page designers to embed the equivalent of a mini-page within a defined area, have led to an increase in text/html calls which make it more difficult to identify the 'parent call' using HTTP traffic alone. Web page elements (e.g., graphics, video, audio, text, etc.) displayed as part of a single web page may not originate from the same website that the user is viewing. For example, a single webpage (retrieved via the "parent call") may display its own content simultaneously with content retrieved from one or more other webpages (retrieved via the "child calls"). The generation of such composite web pages results in additional web traffic (e.g., multiple HTTP requests) when a single web page is accessed. For example, in an email portal such as Gmail, yahoo, or hotmail, in addition to displaying a electronic mail, many additional web page elements may be returned, such as advertisements and widgets (e.g., news feeds, weather displays, etc.) Each widget may have a separate data source different from the data source of the email portal. For example, a weather widget may gather weather data from a weather provider's site. In previous monitoring methods, HTTP traffic would be credited to the weather provider (a child call), even though the user was viewing the data through the widget provided by the email portal (a parent call).

Browsers typically provide information on the Universal Resource Locator (URL) of the page presently being accessed in the browser's Page Info interface. In addition to the URL, the Page Info interface may contain additional information about the page being presented such as, for example, an application type of the content being presented, a rendering mode of the content being presented, an encoding of the content being presented, a last modified data of the content being presented, etc. The user may access the Page Info interface manually by clicking a Page Info control within the browser. The browser may then display the Page Info to the user by means of a dialog box. Of course, any other means of displaying information to the user may be implemented by the browser such as, for example, the Page Info may be displayed as a web page within the browser, the Page Info may be displayed within a system tray notification, etc. Alternatively, the Page Info interface may be accessed programmatically, for example by means of an Application Programming Interface (API).

In example methods, apparatus, and articles of manufacture disclosed herein, Internet usage monitoring is accomplished by monitoring the Page Info interface of the browser, the active tab of the browser, and other sources of monitoring information (e.g., HTTP traffic data, mouse/keyboard info, focus status of the browser, etc.) thereby achieving a more granular and accurate collection of usage data than possible in prior known methods.

In addition to advancements in web page complexity, new features have been implemented in web browsers that increase the challenges of successfully monitoring user activity at the browser. In previous methods, the browser window was only checked to see whether it was in focus on the user's desktop. For example, if a user was viewing a web page in a browser and also had a document open in another application, some prior methods would only credit time to the web page while the browser application was in focus (i.e., the browser was the active window.) Recently, many browsers have begun using a feature called tabbed browsing. In a tabbed browser, multiple web pages can be displayed in respective tabs within the browser application. Only one tab is viewed at a time. However, the tab/web page currently being viewed does not necessarily correspond to the last web page that was requested (e.g., the user can easily switch between tabs to view web pages stored in memory (e.g., cached web pages) without sending a request to the Internet). Further, web content requested from the Internet may not be displayed to the user. For example, it is possible to setup multiple home pages in a browser, each home page associated with a separate tab. When the browser is initialized, each home page may be requested from the Internet, but the user may only actually view the content in a first home page associated with one of the tabs and not switch to the content associated with a second tab. Because of this multi-tab functionality, properly crediting websites with durations of viewing times becomes difficult. By monitoring the Page Info interface of the active tab of the browser, example methods, apparatus, and articles of manufacture disclosed herein properly credit viewing time to the correct web site.

In particular, the Page Info interface of the browser is accessed to determine the parent call identifying the webpage that the user is viewing. In the above email portal/weather widget example, the parent call identifies the email portal and the child call identifies is the weather widget. By crediting only a parent call with a page view, monitoring data can be more closely correlated to what the user is intending to view. The Page Info interface of the browser contains many different properties that help credit viewing to the proper site. Some of the items included in the Page Info interface of the browser are: an address of the site being viewed (e.g., a URL), a type of the site being viewed, a referring URL, a last modified date, meta tags of the site being viewed, etc.

FIG. 1 illustrates a transaction log 100 of computer interaction and browsing events generated by a previous method for monitoring Internet media exposure. The transaction log 100 of FIG. 1 includes columns for a timestamp 105, an HTTP traffic identifier 110, a user interaction indicator 115, an application focus identifier 120, and an application source identifier 125. The timestamp column 105 of the example transaction log 100 shows the time within the browsing session that an event was detected. In the illustrated example, the browsing session lasted four minutes. In the example of FIG. 1, the timestamp column 105 is populated with data to indicate the amount of time that has passed since the start of the browsing session. The timestamp may alternatively be formatted as a time of day of the event (e.g., 3:00:00 PM, 3:03:40 PM, etc.) Further, the timestamp column 105 may additionally or alternatively include a date of the event.

The HTTP traffic column 110 is populated with HTTP traffic data showing the HTTP traffic at the time of the event.

In the illustrated example, detection of an event (e.g., HTTP traffic) causes the generation of the timestamp. Thus, the timestamps may be thought of as a timestamp of the detected event (e.g., an HTTP request) identified in the traffic column 110. As shown in the illustrated example, at 0:00 the user requested data from cnn.com. In response to the user's request for data from cnn.com, the browser additionally requested advertisement data from adfusion.com, and news data from svcs.cnn.com. The close proximity in time of the timestamps indicates that these requests were all part of the same transaction. Thus, although the user is likely to have requested the cnn.com webpage initially, the following requests were likely automatic requests driven by the cnn.com webpage itself. Although a specific set of web sites are shown in the transaction log 100 to illustrate a prior method, any web sites could be included in the transaction log 100, because the contents of the transaction log are dependent upon the activity of the user and the contents of requested web pages.

The user interaction column 115 is used to store user interaction data (e.g., a flag setting) indicating whether the user was interacting with the computer at the time of the recorded event. A determination of whether a user was interacting with the computer at the time of the recorded event may be based upon whether any keyboard or mouse events (e.g., keystrokes, mouse movements, track ball movements, mouse clicks, etc.) have occurred within a time window associated with the event (e.g., in the 3 seconds preceding the event). In the example shown, at 0:05 seconds, a weather application was started. Because in this example there was no user interaction since 0:00, the recorded value of the user interaction 110 at time 0:05 is 'No'. Thus, it can be concluded that the weather application was started in the background while the user's attention was on the cnn.com content.

The application focus column 120 stores application focus data identifying the application that was in focus on the computer at the time of the event. In the example shown, at time 0:00 the monitored browser was in focus. Further, at time 1:05, the application focus changed to a text editor application. At that time, the user may have been interacting with the text editor while the browser was no longer in focus. At time 2:10, the browser came back into focus (e.g., web content rendered by the browser was presented to the user). In the example shown, the application focus 120 stores the name of the application in focus.

The application source column 125 stores application source data indicating the source of the HTTP traffic 110 (e.g., the application that sent the corresponding request for the HTTP traffic.) In the illustrated example, at time 0:00 the application source is the browser. At 0:05 a weather application (e.g., a widget) requested data from weather.com while cnn.com was displayed in the browser, and the application source was consequently stored as the weather application. Additionally, there may be events that do not have an application source. For example at 1:05, the user changed the application focus to a text editor application. At the time of this event, there was no HTTP traffic, and, therefore, no application source data is recorded in the application source column 125.

Figure 2:
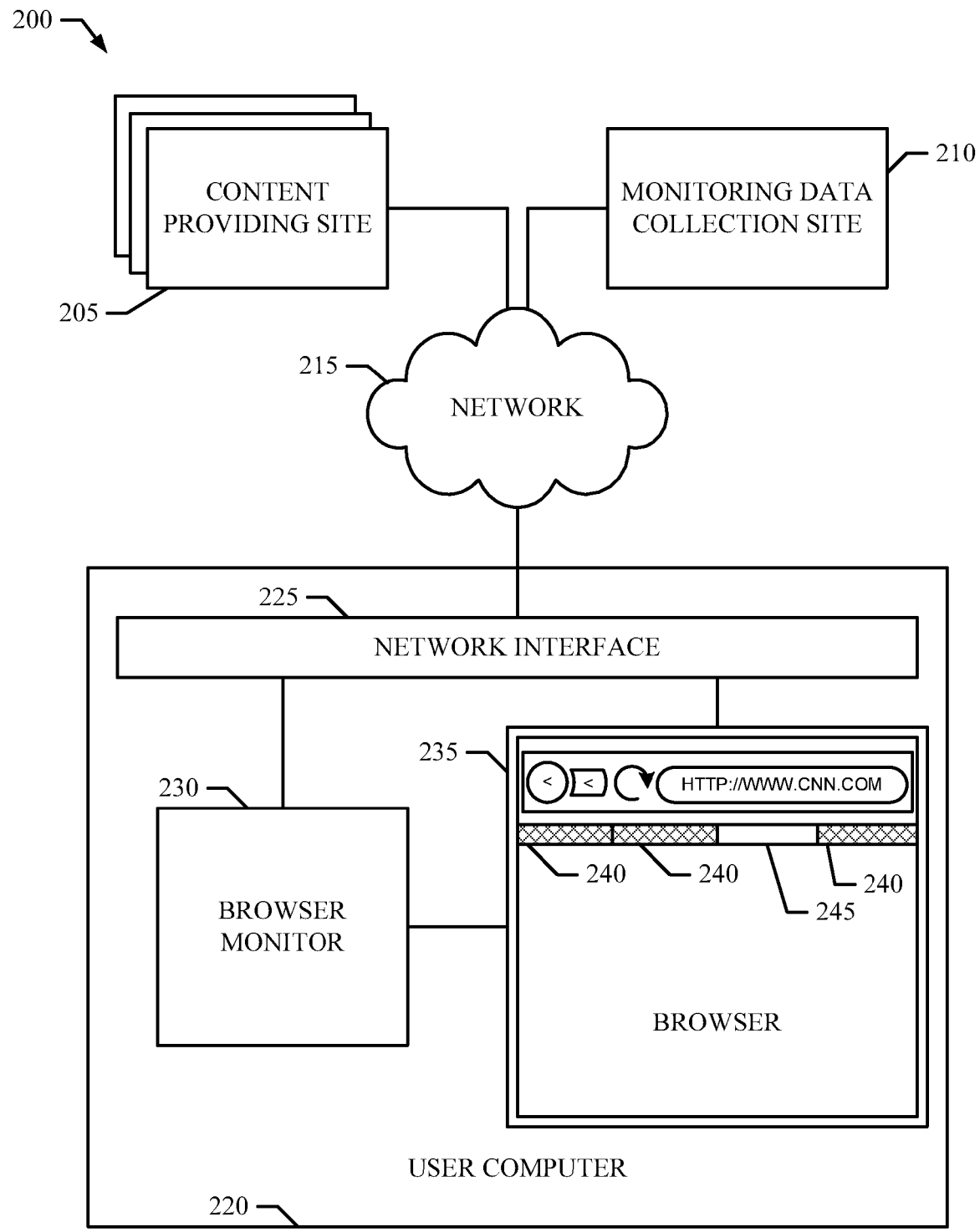
FIG. 2 is a block diagram of an example system to monitor Internet traffic.

FIG. 2 is a block diagram of an example system 200 to distinguish between parent and child web pages and/or browser tabs in focus. The example system 200 includes a content providing server 205, a monitoring data collection server 210, a network 215, a user (e.g., a client) computer 220, a network interface 225, a browser monitor 230, and a browser 235. The browser 235 of the illustrated example includes inactive browser tabs 240 and an active browser tab 245. The example content providing server 205 provides content to the browser 235 in response to an HTTP request. There may be multiple content providing servers 205 identified by different Internet Protocol (IP) addresses and serving different content. For example, in a single session it is likely that a browser will communicate with multiple content providing sites 205. For example, in a single browser session a user may check their email from a first server 205, read a news article served or hosted by a second server 205, and check the weather from a third server 205. The content provider sites 205 may be linked, wherein content from one site is displayed on another site as part of a composite webpage. For example, an email portal content provider site may have a weather widget displaying weather data from a weather content provider site in a window or other portion of a webpage simultaneously displaying the email content.

In the example of FIG. 2, the monitoring data collection server 210 is a site to which the browser monitor 230 reports data. In the illustrated example, the collection site is a neutral third party site that does not provide the monitored content from server 205 to client devices 220 and/or is not involved with delivering content from the content servers 205 to the client device 220. The monitoring data collection site 210 may be associated with an audience measurement and/or web analytics company. The monitoring data collection site 210 may receive data in any fashion. In the illustrated example, monitoring data is transmitted from the browser monitor 230 to the monitoring data collection site 210 by File Transfer Protocol (FTP) communication. Any other system or protocol for transmitting data may additionally or alternatively be used. For example, the data may be transmitted by an HTTP GET request, wherein the request includes the collected data, or some other data transfer or transmission protocol. The monitoring data collection site 210 may process the monitoring data before storing the data, or it may store the data as it is received.

The network 215 of the illustrated example is the Internet. However, any other network could be used. For example, some or all of the network 215 may be a company's intranet network. Although the network 215 of the illustrated example operates based on the HTTP and IP protocols, the network 215 may additionally or alternatively use any other protocol to enable communication between devices on the network.

The user computer 220 of the illustrated example is a personal computer. However, any other type of computing device could be used to implement the computer 220 such as, for example, a mobile (e.g., cellular) phone, a personal digital assistant (PDA), Internet appliance, etc. The user of the illustrated example is a panelist who has agreed to participate in a study. Although the example system of FIG. 2 is a panelist-based system, other non-panelist and/or hybrid panelist systems may be employed. In the panelist system of the illustrated example, demographic information is obtained from the user when the user joins and/or registers for the panel. The demographic information may be obtained from the user via a telephone interview, by having the user complete an online survey, etc.

The network interface 225 is an interface that allows applications running local to the computer 220 to communicate with external sites via the network 215. In the illustrated example, the network interface 225 is a wired Ethernet port. However, any other type of network interface may be used. For example, a WiFi 802.11x wireless network port, a Bluetooth network adapter, or a cellular modem may be used. Additionally or alternatively, there may be multiple network interfaces in any combination of types.

The browser monitor 230 monitors user activity on the computer 220, and more specifically monitors user interaction with the browser 235. In the illustrated example, the browser monitor 230 is an application executed on the computer 200. The application is downloaded on the computer 200 upon receiving user consent. The consent may be obtained via the registration process (e.g., when the user is interviewed to join the panel, when the user completes an online survey to join the panel, etc.) The application may be downloaded via the Internet or sent to the user via a compact disc (CD) or a digital versatile disc (DVD), a Blueray disc, or any other computer readable mediums storing the machine-readable instructions constitutes the application. However alternative architectures or implementations may also be employed such as, for example, embedding the browser monitor in the browser 235 (e.g., a browser plug-in, JavaScript, etc.), monitoring browser activity from a remote site such as the monitoring data collection site 210, etc.

In the illustrated example, browser 235 presents web content to the user. The example browser of FIG. 2 is a tabbed browser. Tabbed browsers allow the user to download multiple web pages and select between the pages using tabs. For example, the user is presented with a first web page on a first tab, a second web page on a second tab, etc. Only one of the web pages is displayed (i.e., active) at a given time (i.e., the page associated with the active tab). The other pages (inactive pages) associated with the inactive tabs are stored or cached for later viewing. The tab associated with the currently displayed web content is known as the active browser tab 245, while tabs associated with currently non-displayed web content are known as inactive browser tabs 240. In the illustrated example, the browser 235 is Mozilla Firefox®. However, any other tabbed browser may also be used such as, for example, Microsoft Internet Explorer®, Apple Safari®, Google Chrome™, etc. At any given time, there may be one or any number of browser tabs instantiated in a browser. The browser tabs that are associated with content but are not currently displayed and/or selected are considered inactive browser tabs 240.

While the example of FIG. 2 illustrates only one client device 220, multiple client devices 220 (each monitored by a separate browser monitor 230) are present. The client devices 220 may be associated with different panelists, households, locations, and/or groups of panelists (e.g., a family). Similarly, while FIG. 2 illustrates one collection site 210, more than one collection server 210 may be employed and/or the collection server may be organized into hierarchical and/or geographic regions.

Figure 3:
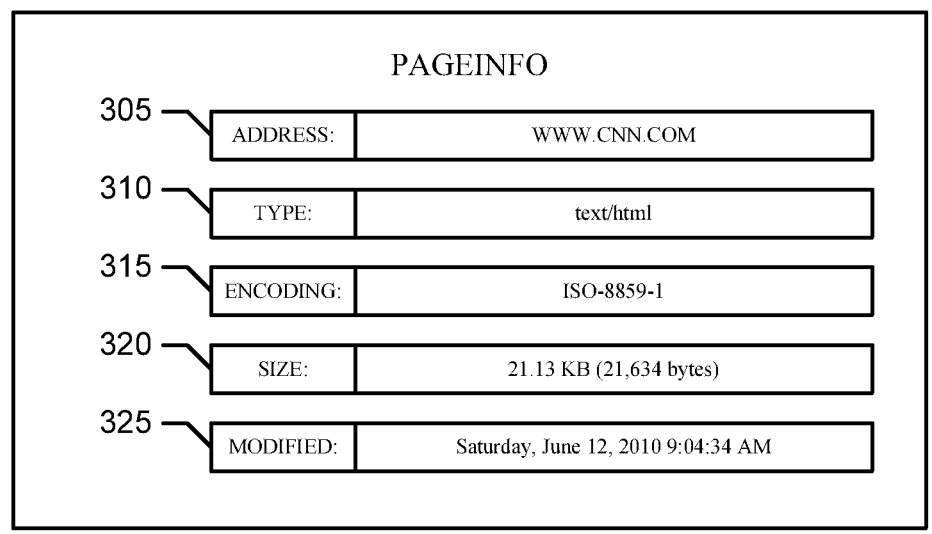
FIG. 3 is a diagram of example collected Page Info data.

FIG. 3 is a diagram illustrating example collected Page Info data 300. The example Page Info data 300 is collected from the browser 235 by the browser monitor 230, and includes an address field 305, a content type field 310, a content encoding field 315, a content size field 320, and a modified date field 325. Any other fields may be included in the Page Info data 300 such as, for example, a metadata field, page rendering type fields, a page title field, etc. The browser 235 derives the fields from the HTTP message of the received web content. Although the illustrated example employs the HTTP header specification (RFC 2616) to derive some or all of the fields of the Page Info data 300 from the HTTP header of the HTTP message, any past, present, or future standards may be employed. The address field 305 describes the address of the page currently being displayed by the browser 235. The address field 305 is derived from the host field of the HTTP header of the received web content. By monitoring the address field 305 of the Page Info data 300, the browser monitor 230 can determine what website the parent call identifies (instead of relying on HTTP traffic to predict and/or infer what is being displayed.) The content type field 310 describes the application type of the content being displayed (e.g., content types include text/plain, text/html, multipart/alternative, etc.) The encoding field 315 indicates the type of encoding used for the webpage. Common encoding types are ISO-8859-1 and UTF-8, but any other encoding type may be used. The content size field 320 indicates the size of the web page being displayed by the browser 235. The content size field 320 can be any value, and is dependent on the particular content being presented. The modified date 325 shows the last time that the page being displayed was modified. In the illustrated example, the web page served by www.cnn.com has a content type 310 of text/html, a content encoding 315 of ISO-8859-1, a content size 320 of 21.13 KB, and was last modified 325 on Saturday, Jun. 12, 2010.

Figure 4:
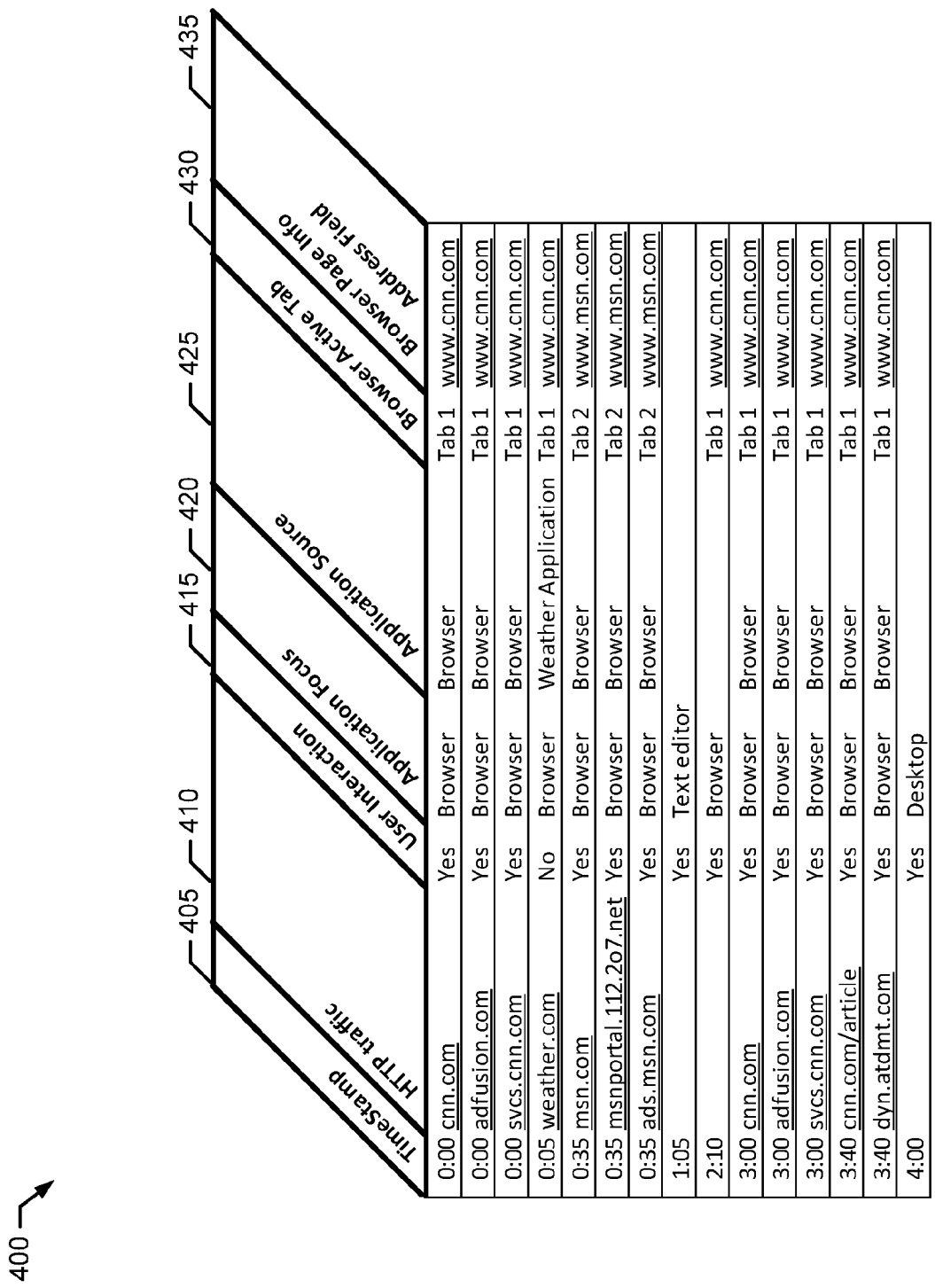
FIG. 4 illustrates an example enhanced transaction log of computer interaction and browsing events, including browser tab information and Page Info data.

FIG. 4 illustrates an example enhanced transaction log 400 of computer interaction and browsing events generated by the example system of FIG. 2. The example enhanced transaction log 400 of FIG. 4 includes fields similar to the known transaction log 100 of FIG. 1. For example, the enhanced transaction log 400 includes columns for a timestamp 405 (similar to the timestamp 105), an HTTP traffic identifier 410 (similar to the HTTP traffic identifier 110), a user interaction indicator 415 (similar to the user interaction indicator 115), an application focus identifier 420 (similar to the application focus identifier 120), and an application source identifier 425 (similar to the application source identifier 125). In addition to the fields that are similar to those from FIG. 1, the example enhanced transaction log 400 additionally includes a browser active tab column 430 and a browser Page Info address column 435.

The example user interaction data column 415 of FIG. 4 is stored as a Boolean value (e.g., Yes/No, True/False, I/O, etc.). However, any type of data may be stored as user interaction data such as, for example, the time since the last user interaction, the type of the last user interaction, a record of keystrokes or mouse clicks since the last event, etc.

The application focus column 420 of FIG. 4 stores the name of the application in focus. However, additional information may also be stored in the application focus column 420 and/or any other column(s) that may be added to FIG. 4 such as, for example, the location of the application on the display of the computer, how much processor time the application is consuming, files opened by the application, etc.

The application source column 425 identifies the application to which HTTP traffic is being sent (e.g., in response to a request for a webpage.) However, additional information may also be stored in the application source column 425 and/or in any other column(s) that may be added to FIG. 4 such as, for example, a process identifier for the application, a name of the executable that the HTTP traffic was sent to, an identifier for a network interface used to receive the HTTP traffic, etc.

The example browser active tab column 430 indicates the active tab of the browser at the time of the event logged in the corresponding row as indicated by the timestamp column 405. For example, at time 0:00, the user had selected a first tab (e.g., Tab 1) of the browser to view cnn.com. At time 0:35, the user opened a second tab within the browser to view msn.com. Further, at time 2:10, the user brought the browser into focus after having previously switched the focus to the text editor (as shown at time 1:05). Analysis of the browser active tab data 430 reveals that at time 2:10, the user also brought the first tab into focus within the browser. Accordingly, the time periods from 0:00 to 0:35 and 2:10 to 4:00 can be properly credited to cnn.com, whereas previous methods may have miscredited the presentation time period from 2:10 to 3:00 because the records would have indicated that the last page viewed was msn.com. In the illustrated example, the browser active tab 430 is determined by querying an Application Programming Interface (API) of the browser. The API returns data identifying the active tab. However, any other implementation may additionally or alternatively be used. For example, JavaScript code may be inserted into a webpage displayed by the browser which facilitates detection of the active tab, or a plug-in may be installed into the browser which facilitates detection of the active tab.

The browser Page Info address field 435 allows the browser monitor 230 to more clearly identify the site that the user was viewing at the time of the event. For example, at time 0:00 the user initially requested cnn.com through the browser. Based on the data from cnn.com, the browser additionally requested data from adfusion.com and svcs.cnn.com. For example, the content from cnn.com may have included advertisements from adfusion.com and an RSS (Really Simple Syndication) feed from svcs.cnn.com. By analyzing the browser Page Info address field 435, the browser monitor 230 can determine whether the site being viewed correlates to the HTTP traffic 410, and can allocate recorded viewing time accordingly.

Figure 5:
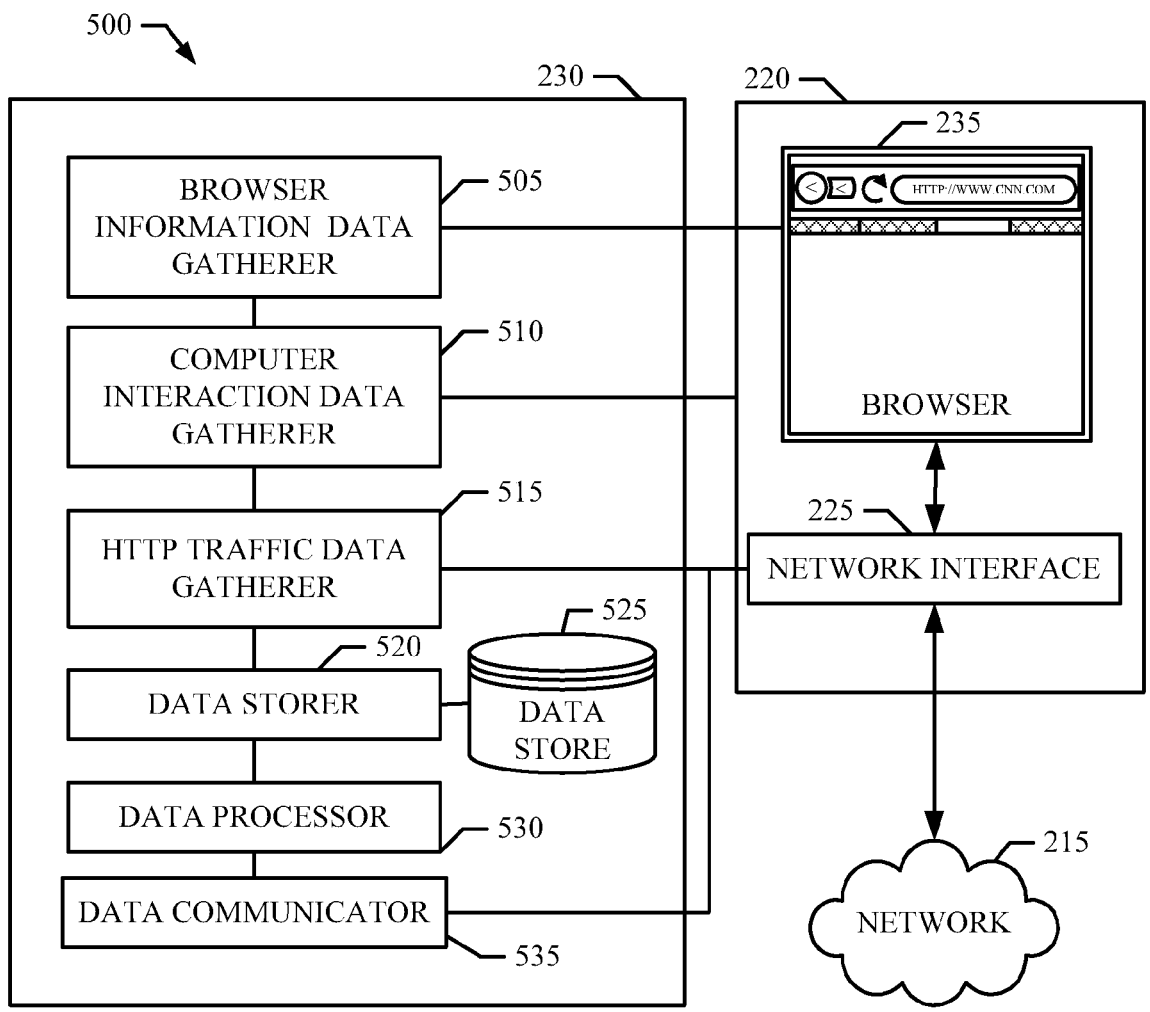
FIG. 5 is a more detailed block diagram of the example browser monitor of FIG. 2.

FIG. 5 is a block diagram of an example implementation of the example browser monitor 230 of FIG. 2. The example browser monitor 230 includes a browser information data gatherer 505, a computer interaction data gatherer 510, a Hypertext Transfer Protocol (HTTP) traffic data gatherer 515, a data storer 520, a data store 525, a data processor 530, and a data communicator 535. The browser information data gatherer 505 gathers browser information data from the browser 235, allowing browser properties and currently displayed data to be collected for analysis. In the illustrated example, the browser information data gatherer 505 collects Page Info data from the browser as well as information on the active tab of the browser. However, other data may also be gathered from the browser such as, for example, browser cookies, installed plug-ins, etc. The Page Info data as shown in FIG. 3, contains the address (e.g., the address field 305 of FIG. 3) of the page being displayed, the type (e.g., the content type field 310 of FIG. 3) of the page being displayed, the encoding (e.g., the encoding type field 315 of FIG. 3) of the page being displayed, etc. The information on the active tab of the browser may include the status of the active tab, the position of the tab, and the number of tabs open within the browser. However, any other information related to the browser 235 may also be collected.

The computer interaction data gatherer 510 gathers data related to user interactions with the computer 220. In the illustrated example, the computer interaction data includes events associated with the mouse and keyboard (e.g., mouse clicks, mouse movements, keystrokes, trackball movements, track pad movements, etc.), as well as information about whether the browser 235 was in focus. However, any other data of interest may be gathered such as, for example, a list of other applications that are being executed, software versions of applications installed on the computer, focus status of other applications that are being executed, etc. In the illustrated example, events are collected by monitoring operating system events (e.g., via a keyboard or mouse hook). However, any other methods of monitoring operating system events may additionally or alternatively be used such as, for example, monitoring operating system files or memory, using an operating system API, etc.

The HTTP traffic data gatherer 515 gathers HTTP traffic data sent and/or received by the user computer 220. In the illustrated example, the HTTP traffic data gatherer 515 gathers clickstream data by monitoring the network interface 225 for HTTP requests and responses. Alternatively, HTTP traffic data may be gathered directly from the browser via a browser plug-in that records HTTP traffic. The example HTTP traffic data gatherer 515 filters HTTP traffic based on a library of terms of interest so that only items matching a specific type (e.g., messages including an HTTP reply) are recorded. However, the HTTP traffic data gatherer 515 may alternatively be configured to collect/record all HTTP traffic or may use some other sort of filter. In the illustrated example, HTTP traffic data includes any message from one computer to another. Such messages often include a Universal Resource Locator (URL). Additionally, the HTTP traffic data may include data identifying the originating software application. For example, the HTTP traffic data may indicate that the originating software application is a word processing application requesting updates from a server via an HTTP request. In that case, the HTTP traffic data gatherer 515 of some examples will disregard the HTTP traffic, as it does not relate to user interaction with a browser.

The example data storer 520 of FIG. 5 is implemented by a processor (e.g., the processor 900 of FIG. 9) executing instructions, but it could alternatively be implemented by an Application Specific Integrated Circuit (ASIC), Digital Signal Processor (DSP), Field Programmable Gate Array (FPGA), or other circuitry. The data storer 520 receives monitoring data from the browser information data gatherer 505, the computer interaction data gatherer 510, and the HTTP traffic data gatherer 515, and stores the data in the data store 525. The data store 525 may be implemented by any device and/or medium for storing data such as, for example, solid-state memory, flash memory, magnetic media such as a hard disk drive, random access memory, optical media such as a compact disc (CD) or a digital versatile disc (DVD), etc. Furthermore, the data stored in the data store 525 may be in any data format such as, for example, binary data, comma delimited data, tab delimited data, structured query language (SQL) structures, etc.

The example data processor 530 of FIG. 5 is implemented by a processor executing instructions, but it could alternatively be implemented by an ASIC, DSP, FPGA, or other circuitry. The data processor 530 parses the data stored in the data store 525 by the data storer 520 to determine which websites were viewed and how long each of the web sites were viewed. In the illustrated example, the data processor 530 uses HTTP traffic data, mouse and keyboard data, application focus data, and active tab data to determine what web site a user was presented, and how long the web site was presented. Further, the data processor 530 may store additional data in the data store 525 such as, for example, classification data and/or crediting data as will be discussed in connection with FIGS. 7 and 8. Although the example of FIG. 5 illustrates the data processor 530 as a component of the browser monitor 230, in other examples, the data processor 530 may be a component of the data collection site 210.

The example data communicator 535 of FIG. 5 is implemented as an Ethernet interface. However, any other method of implementing the data communicator could alternatively be used. For example, the data communicator 535 may represent a TCP/IP stack. The data communicator communicates with the monitoring data collection site 210 to report the monitoring data collected by the browser monitor 230.

While an example manner of implementing the example browser monitoring system 230 has been illustrated in FIGS. 2 and 5, one or more of the elements, processes and/or devices illustrated in FIGS. 2 and 5 may be combined, divided, rearranged, omitted, eliminated, and/or implemented in any other way. Further, the example browser information data gatherer 505, the computer interaction data gatherer 510, the HTTP traffic data gatherer 515, the data storer 520, the data processor 530, and/or more generally, the example browser monitor 230 of FIGS. 2 and 5 may be implemented by hardware, software, firmware and/or any combination of hardware, software and/or firmware. Thus, for example, any of the example browser information data gatherer 505, the computer interaction data gatherer 510, the HTTP traffic data gatherer 515, the data storer 520, the data processor 530, and/or more generally, the example browser monitor 230 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example browser information data gatherer 505, the computer interaction data gatherer 510, the HTTP traffic data gatherer 515, the data storer 520, and/or the data processor 530 are hereby expressly defined to include a tangible computer readable medium such as a memory, DVD, CD, etc. storing the software and/or firmware. Further still, the example browser information data gatherer 505, the computer interaction data gatherer 510, the HTTP traffic data gatherer 515, the data storer 520, and/or the data processor 530 of FIGS. 2 and 5 may include one or more elements, processes and/or devices in addition to, or instead of, those illustrated in FIGS. 2 and 5, and/or may include more than one of any or all of the illustrated elements, processes and devices.

Figure 6:
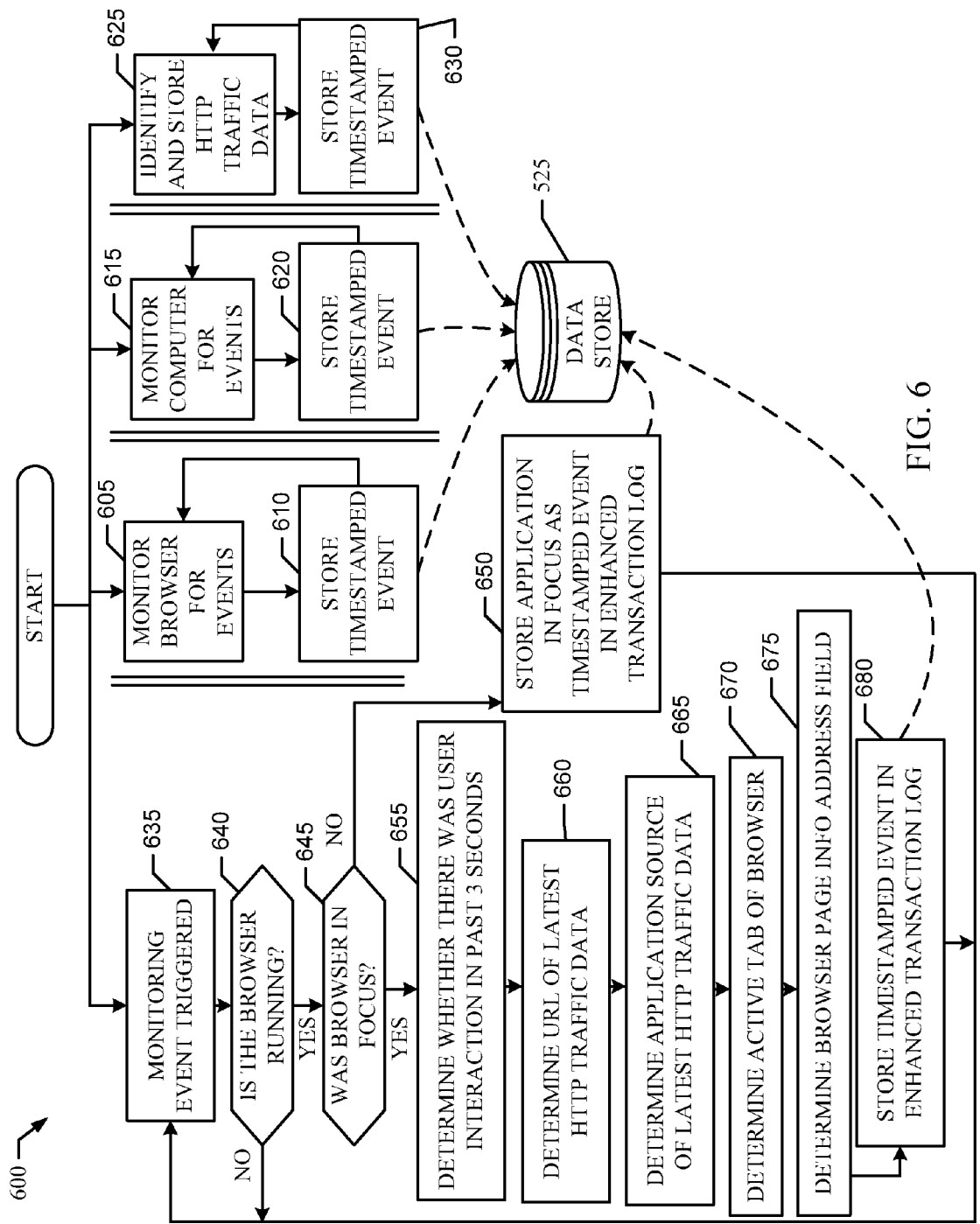
FIG. 6 is a flowchart representative of example machine-readable instructions that may be executed to implement the example system and/or browser monitor of FIGS. 2 and 5.
Figure 7:
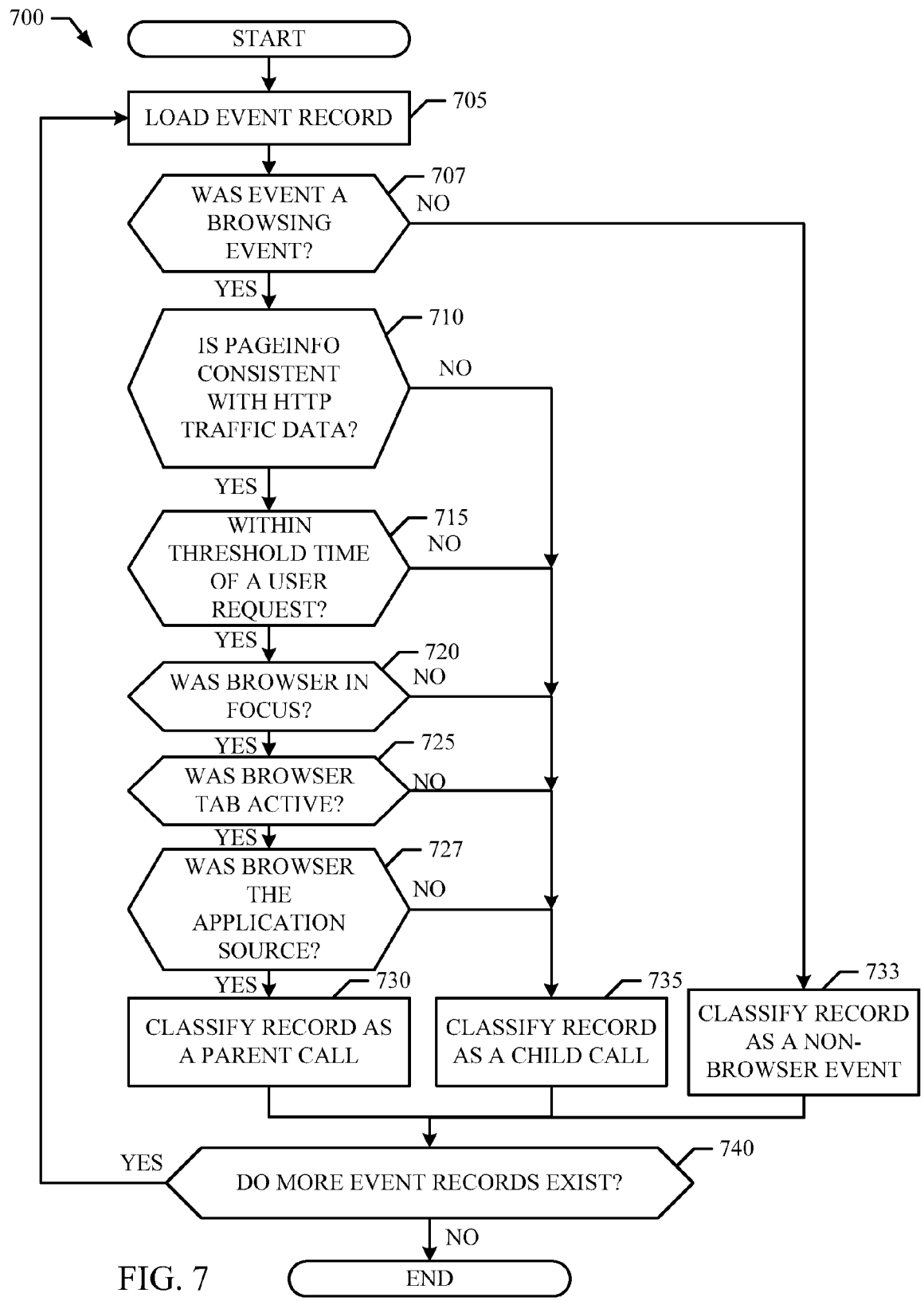
FIG. 7 is a flowchart representative of example machine-readable instructions that may be executed to implement the example data processor of FIG. 5.
Figure 8:
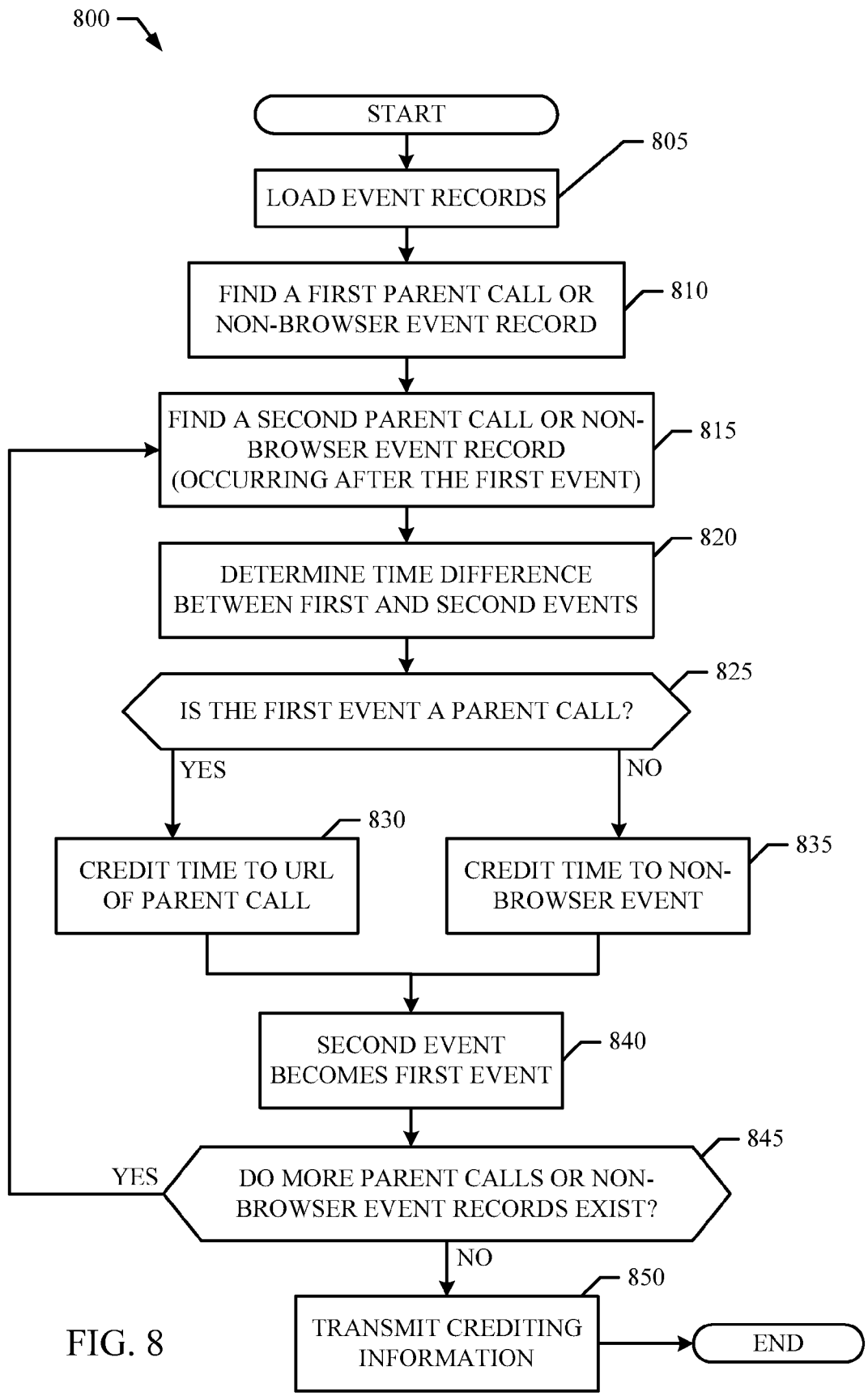
FIG. 8 is a flowchart representative of example machine-readable instructions that may be executed to implement the example system and/or browser monitor of FIGS. 2 and 5.

FIGS. 6, 7, and 8 are flowcharts representative of example machine-readable instructions that may be executed to implement the browser monitor 230 and/or components of the browser monitor 230. In these examples, the machine-readable instructions represented by each flowchart may comprise a program for execution by a processor, such as the processor 912 shown in the example computer 900 discussed below in connection with FIG. 9. The program may be embodied in software stored on a tangible medium such as, for example, a flash memory, a CD-ROM, a floppy disk, a hard drive, a DVD, or a memory associated with the processor 912, but the entire program and/or portions thereof could alternatively be executed by a device other than the processor 912 and/or embodied in firmware or dedicated hardware. Further, although the example program is described with reference to the flowcharts illustrated in FIGS. 6, 7, and 8, many other methods of implementing the example browser monitor 230 and/or components of the browser monitor 230 may alternatively be used. For example, the order of execution of the blocks may be changed, and/or some of the blocks described may be changed, eliminated, or combined.

As mentioned above, the example processes of FIGS. 6, 7, and 8 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6, 7, and 8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 6 is a flowchart representative of example machine-readable instructions 600 that may be executed by the processor 912 to implement the browser monitor 230 and/or to collect monitoring data. The example data collection process 600 begins when a user starts the browser monitor 230. The user may start the browser monitor 230 by clicking on an icon via the graphical user interface of the computer 220. Alternatively, the browser monitor 230 may be continually executed and may start when the user turns the computer 220 on. Further, the execution of the browser monitor 230 may be triggered by the user starting the browser 235.

Upon the start of the browser monitor 230, multiple operations are performed in parallel with each other. The browser information data gatherer 505 monitors the browser 235 for events (block 605). The browser events that the browser information data gatherer 505 monitors for can be any events associated with the browser such as, for example, a change in the Page Info address field 435, a change in the browser active tab 430, etc. The data storer 520 then stores the monitored browser events in the data store 525 (block 610). Control then proceeds to block 605, where the browser information data gatherer 505 continues to monitor for browser events.

The computer interaction data gatherer 510 monitors the computer 220 for computer events (block 615). The computer events that the computer interaction data gatherer 510 monitors for can be any computer interaction events associated with the computer 220. In the illustrated example, computer interaction is detected by monitoring operating system events such as mouse clicks and keystrokes (e.g., via a keyboard hook, an operating system API, etc.). Additionally or alternatively, monitoring computer interaction may include monitoring the user via a web camera or microphone to, for example, identify the user operating the computer. This is particularly useful for monitoring computers that are used by more than one person (e.g., a family PC). The data storer 520 then stores the monitored computer interaction events in the data store 525 (block 620). Control then proceeds to block 615 where the computer interaction data gatherer 510 continues to monitor for computer interaction events.

The HTTP traffic data gatherer 515 monitors the network interface 225 for HTTP traffic (block 625). The HTTP traffic that the HTTP traffic data gatherer 515 monitors for can be any HTTP traffic received and/or requested by the network interface 225. For example, the HTTP traffic data gatherer 515 may filter the HTTP traffic such that only HTTP requests are monitored. Additionally or alternatively, the HTTP traffic data gatherer may monitor all HTTP traffic at the network interface 225. The data storer 520 stores the monitored HTTP traffic in the data store 525 (block 630). Control then proceeds to block 625 where the HTTP traffic data gatherer 515 continues to monitor for HTTP traffic.

The data processor 530 of the browser monitor 230 waits for a trigger event (block 635). The trigger event may be any sort of trigger event such as, for example, the expiration of a timer, the detection of a browser event being stored in the data store 525 as shown in block 610, the detection of a computer interaction event being stored in the data store 525 as shown in block 620, and/or the detection of HTTP traffic being stored in the data store 525 as shown in block 630. The data processor 530 then determines if the browser is running (block 640). In the illustrated example, determining if the browser is running is implemented by polling the computer interaction data gatherer 510, which may return a list of active applications. Alternatively, the data processor 530 may query the data store 525 to determine if the browser is running (e.g., based on computer interaction events stored in the data store 525 in block 620). If the browser is not running, control returns to block 635 to wait for another trigger event. Alternatively, the data processor 530 may wait for a period of time before monitoring for another trigger event (e.g., 50 milliseconds, 500 milliseconds, 1 second, 2 seconds, etc.) to prevent the browser monitor 230 from utilizing an excessive amount of processor resources. As a further alternative, if the browser monitor is implemented to begin upon the starting of the browser, a determination that the browser is not running in block 640 may indicate that the browsing session has been terminated. Accordingly, the data processor 530 may begin the processes shown in FIGS. 7 and 8, and the data collection process 600 shown in FIG. 6 may be terminated.

If the browser 230 is running (block 640), the data processor 530 determines if the browser is in focus (block 645). The focus state of the browser shows whether the application window of the browser is the active window of the computer (e.g., as compared to another application). In the illustrated example, the data processor 530 determines if the browser is in focus by reviewing computer interaction events stored in the data store 525. In particular, the data processor 530 may look at computer interaction events that pertain to a change in the active window of the computer 220. Alternatively, the data processor 530 may poll the computer interaction data gatherer 510 to request the application that is presently in focus. If the browser is not in focus, the data processor 530 stores a timestamped record of the event in the enhanced transaction log 400. For example, in FIG. 4, the text editor was brought into focus at time 1:05. The event record stored in this case may only contain the timestamp and application that was in focus. Additionally or alternatively, any other field of the enhanced transaction log 400 of FIG. 4 may also be populated with data related to the event.

If the browser is in focus, the data processor 530 proceeds to determine whether there has been user interaction (e.g., via the user interaction data 415) within the past 3 seconds to determine if the triggering event was user initiated (block 655). The data processor 530 of the illustrated example determines whether there was user interaction by querying recent computer interaction data events from the data store 525 (e.g., events that were stored in the data store in block 620). The data processor 530 may use any duration of time to determine if there was recent user activity. For example, the data processor 530 may use a duration of 5 seconds, 1 second, etc. Further, the duration of time may be dynamic and may change over time. After completion of block 655, control proceeds to block 660.

Next, the data processor 530 determines the URL of the latest HTTP traffic data (block 660). The data processor 530 determines the URL of the latest HTTP traffic data by querying the data store 525 for recent HTTP traffic data, and may decode the HTTP traffic to determine the source (e.g., by decoding the header of the HTTP message). Control then proceeds to block 665 where the data processor 530 determines the application source of the latest HTTP traffic data (block 665). The application source of the HTTP traffic is the application on the computer 220 that was transmitting or receiving the HTTP traffic (e.g., a web browser, an email client, a newsreader, a weather application, etc.). The data processor 530 may determine if the application source was a browser by referencing the application source against a list of known browsers. Further, the data processor 530 may also determine if the application source was from an approved browser. For example, the HTTP traffic may be directed towards a browser that does not support features required for accurately monitoring user activity, tabbed browsing, the inability to respond to requests for Page Info data, or an incompatible browser version. Any of these inadequacies may result in a browser not being approved. If a browser was the source, the data processor 530 determines the active tab of the browser 235 (block 670). The data processor 530 may determine the active tab of the browser by querying browser events stored in the data store 525 (e.g., events that were stored by the Data Storer 520 in block 610). Alternatively, the data processor may poll the browser information data gatherer 505 to retrieve the currently active tab of the browser. After gathering and storing the browser active tab data, control then proceeds to block 675.

Next, the data processor determines the browser Page Info address field (e.g., the browser Page Info address field 435). The data processor determines the Address Field by querying the latest Page Info data from the data store 525 (e.g., Page Info data that was stored by the Data Storer 520 in block 610). Control then proceeds to block 680, where the data processor stores the timestamped event in the Enhanced Transaction Log within the Data Store 525. The timestamped event includes data that was determined in blocks 655-675.

FIG. 7 is a flowchart representative of example machine-readable instructions that may be executed to implement the example browser monitor 230 and/or to distinguish between parent and child calls. The example data classification process 700 classifies events in the enhanced transaction log 400 as either a parent call or a child call. Both parent and child calls represent requests for web content from web host(s). Within a web page, there may be additional content that is linked from a different server than the one serving a parent web page. For example, a news site may display advertisements from an advertisement provider. Because, the user requested the news site, the news site is classified as a parent call while the advertisement site is classified as a child call. Typically, the child call is specified by the parent website, wherein the parent call is specified by a user.

The example data classification process 700 begins when the browser monitor is instructed to classify the data stored in the data store 525. The example data classification process 700 may be started periodically (e.g., every 30 minutes, every 24 hours, every week, etc.) or it may also be started aperiodically (e.g., when the data store 525 reaches a specified amount of data, when receiving a request for a data upload from the monitoring data collection site 210, when a browsing session is terminated, etc.) Although FIG. 7 is described as being performed by the browser monitor 230, in some examples it is performed by the collection site 210.

The data processor 530 begins the data classification process by loading an event record (block 705). The event record may be in the form of a row of data from the Enhanced Transaction Log 400. The data processor 530 then determines if there was any HTTP traffic (e.g., HTTP traffic 410) associated with the event. If there was no HTTP traffic, then the data processor 530 classifies the event as a non-browser event (block 733). A non-browser event is an event that occurred in association with an application different from the browser. For example, in FIG. 4, the record at time 2:10 is a non-browser event because there was no HTTP traffic data 410 at the time of the event.

Next, the data processor 530 determines if browser Page Info address field 435 is consistent with the HTTP traffic data 410 (block 710) by looking for text similarities. For example, if the HTTP traffic data 410 exactly matches the browser Page Info address field 435, then the two items are consistent. Additionally or alternatively, the data processor 530 may determine if the top-level domain of the HTTP traffic data 410 substantially matches the browser Page Info address field 435 as a measure of whether the two items are consistent. If the Universal Resource Locator (URL) from the Page Info address field 435 is consistent with the HTTP traffic data 410, then there is a possibility that the event record should be classified as a parent call. If there is no correlation between the HTTP traffic data 410 and the Page Info address field 435 of the event record (e.g., HTTP traffic data 410 indicates that the traffic was associated with weather.com while the Page Info address field 435 indicates that the displayed page was yahoo.com), then the event record is classified as a child call (block 735).

In order to further classify an event record as either a parent or child call, the user interaction data 415 of the event record is analyzed to determine if there was user interaction at the time of the event (block 715). If there was user interaction at the time of the event, there still exists a possibility that the event should be classified as a parent call. If there was no user interaction at the time of the event, then the event is classified as a child call (block 735).

Next, the data processor 530 analyzes the application focus data 420 to determine whether or not the browser was in focus at the time of the event by evaluating the application focus data 420 (block 720). If the browser was in focus, there still exists a possibility that the event record should be classified as a parent call. If the browser was not in focus, then the event record is classified as a child call (block 735).

The data processor 530 analyzes the event record to determine if the browser tab was active by evaluating the browser active tab data 430 (block 725). If the tab was not active (block 725), the event should be classified as a child call (block 735). If the browser tab was active (block 725), then there still exists a possibility that the event record should be classified as a parent call.

Next, the data processor 530 determines whether the browser was the application source by evaluating the application source data 425 (block 727). If the browser is the application source (block 727), then the event record is classified as a parent call (block 730). If the browser is not the application source, (block 727), the event record is classified as a child call (block 735).

Irrespective of whether the event is a parent call, child call, or non-browser event (blocks 730, 733, and 735), the data processor 530 stores the events in the data store 525 via the data storer 520. After storing the record, the data processor 530 determines if there are more records to be analyzed (block 740). If more records exist, control returns to block 705 where the data processor 530 loads the next event record (block 705). If no additional records exist for analysis (e.g., all records have been analyzed) (block 740), the event classification process 700 terminates.

FIG. 8 is a flowchart representative of example machine-readable instructions that may be executed to implement the example system of FIG. 2 and/or the example browser monitor of FIGS. 2 and 5. The example crediting process 800 credits time to parent calls in the enhanced transaction log 400, to achieve more accurate time-spent reporting. Time-spent reporting reports how long a user viewed a specific site. The example crediting process 800 may be performed by the browser monitor and/or at the monitoring data collection server 210. However, the following example assumes the crediting process 800 is implemented by the browser monitor 230.

The example crediting process 800 begins when the browser monitor 230 is instructed to credit time to parent calls stored in the data store 525. The example crediting process 800 may be started periodically (e.g., every 30 minutes, every 24 hours, every week, etc.) and/or it may be started aperiodically (e.g., when the data store 525 reaches a specified threshold amount of data, when receiving a request for a data upload from the monitoring data collection site 210, when a browsing session is terminated, when the classification process 700 terminates, etc.)

The data processor 530 begins the crediting process by loading event records from the data store 525 (block 805). The data processor 530 then finds a first parent call or non-browser event record (block 810). In the example illustrated in FIG. 4, the first parent call is the request to cnn.com at time 0:00. The data processor then finds a second parent call or non-browser event record (block 815). The second parent call or non-browser event record occurs after the first event. The second parent call or non-browser event record may also be the termination of the event records (e.g., there are no more parent calls or non-browser events). Typically, the browsing session will end with a non-browser event as the user terminates the browser and the application focus changes to another application. In the example illustrated in FIG. 4, the second parent call is the request to msn.com at time 0:35. Next, the data processor 530 determines the time difference between the first and second event records (block 820). In the preceding example, the time difference between the first and second parent calls is 35 seconds. The amount of time difference between the first and second event records varies based on the user's behavior and is based on the timestamps (e.g., the timestamp 405) of the event records.

Next, the data processor 530 determines if the first event is a parent call. If the first event is a parent call, then the difference in time calculated at block 820 is credited to the URL of the parent call (e.g., the URL defined by the browser Page Info address field 435) (block 830). If the first event is not a parent call (e.g., a non-browser event), then the calculated difference in time is credited to the non-browser event (block 835). Irrespective of whether the credit is given to a URL or a non-browser event, the crediting information is stored in the data store 525 by the data storer 520.

The data processor 530 then converts the second event into the first event (block 840). This allows the data processor to sequentially identify parent calls or non-browser events. Next, the data processor 530 determines if more parent calls or non-browser events exist in the event records (block 845). If more parent calls or non-browser events exist, control returns to block 815, where the next parent call or non-browser event is labeled as the second parent call or non-browser event. Again, the second parent call or non-browser event occurs after the first parent call or non-browser event. If there are no more parent calls or non-browser event records in the log (e.g., the end of the event records has been reached), the network communicator 535 transmits the crediting information to the monitoring data collection site 210. Additionally or alternatively, the network communicator 535 may also transmit any other data stored in the data store 525. Further, the network communicator 535 may transmit the data stored in the data store 525 at any point in the processes shown in FIGS. 6-8. Alternatively, the classification process 700 and the crediting process 800 may be performed at the monitoring data collection site 210. If so, block 850 is implanted in conjunction with FIG. 6, wherein the collected event records are transmitted to the monitoring data collection server 210. After the network communicator 535 transmits the crediting information to the monitoring data collection site 210 (block 850) or if the process 800 is performed at the collection server, when no more events exist (block 845) the crediting process terminates.

Figure 9:
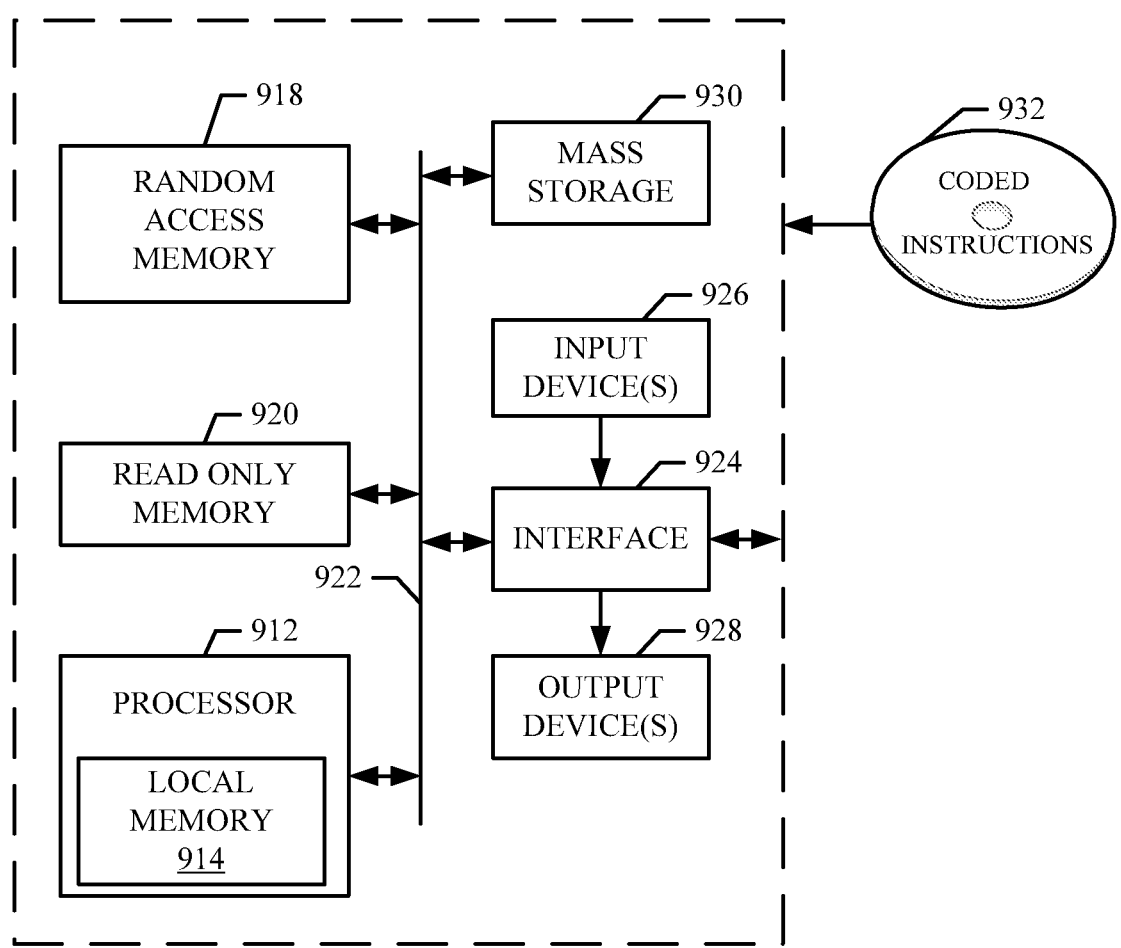
FIG. 9 is a block diagram of an example computer that may execute, for example, the machine-readable instructions of FIGS. 6, 7, and/or 8 to implement the example browser monitor of FIGS. 2 and 5.

FIG. 9 is a block diagram of an example computer 900 capable of executing the machine readable instructions represented by FIGS. 6, 7, and 8 to implement the system of FIG. 2, the data collection server of FIG. 2, and/or the browser monitor of FIGS. 2 and/or 5. The computer 900 can be, for example, a server, a mobile phone (e.g., cellular phone), a personal computer, a personal digital assistant (PDA), an Internet appliance, a digital video recorder (DVR), a set top box, a dedicated device, or any other type of computing device.

The system 900 of the instant example includes a processor 912 such as a general-purpose programmable processor. For example, the processor 912 can be implemented by one or more Intel® microprocessors from the Pentium® family, the Itanium® family or the XScale® family. Of course, other processors from other families are also appropriate.

The processor 912 is in communication with a main memory including a volatile memory 914 and a non-volatile memory 918 via a bus 922. The volatile memory 918 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 918 may be implemented by flash memory and/or any other desired type of memory device. Access to the main memory 918, 920 is typically controlled by a memory controller (not shown).

The computer 900 also includes an interface circuit 924. The interface circuit 924 may be implemented by any type of interface standard, such as an Ethernet interface, a universal serial bus (USB), and/or a PCI express interface.

One or more input devices 926 are connected to the interface circuit 924. The input device(s) 926 permit a user to enter data and commands into the processor 912. The input device(s) can be implemented by, for example, a keyboard, a mouse, a touchscreen, a track-pad, a trackball, isopoint, a remote, and/or a voice recognition system.

One or more output devices 928 are also connected to the interface circuit 924. The output devices 928 can be implemented, for example, by display devices (e.g., a liquid crystal display, a cathode ray tube display (CRT), a printer and/or speakers). The interface circuit 924, thus, typically includes a graphics driver card.

The interface circuit 924 also includes a communication device (e.g., the network interface 225) such as a modem or network interface card to facilitate exchange of data with external computers via a network 215 (e.g., an Ethernet connection, a digital subscriber line (DSL), a telephone line, coaxial cable, a cellular telephone system, etc.).

The computer 900 also includes one or more mass storage devices 930 for storing software and data. Examples of such mass storage devices 930 include floppy disk drives, hard drive disks, compact disk drives and digital versatile disk (DVD) drives. The mass storage device 930 may implement the data store 525.

The coded instructions of FIGS. 6, 7, and 8 may be stored in the mass storage device 930 in the local memory 914, in the volatile memory 918, in the non-volatile memory 920, and/or on a removable storage medium such as a CD or DVD 932.

In addition, although certain example methods, apparatus, and articles of manufacture have been described herein, the scope of coverage of this patent is not limited thereto. On the contrary, this patent covers all apparatus, methods, and articles of manufacture fairly falling within the scope of the appended claims either literally or under the doctrine of equivalents.

What is claimed is:

1. A method to identify a window in a browser, the method comprising:
   identifying, by executing a first instruction with a processor, a first HTTP call associated with the browser on a monitored device;
   identifying, by executing a second instruction with the processor, a second HTTP call, the first and second HTTP calls occurring between consecutive user actions on the monitored device;
   in response to identifying at least one of the first HTTP call or the second HTTP call, requesting, by executing a third instruction with the processor, Page Info data from the browser; and
   determining, by executing a fourth instruction with the processor, that (1) the first HTTP call is a parent call if a first universal resource locator (URL) of the first HTTP call matches a second universal resource locator of the Page Info data of the browser, and (2) that the second HTTP call is a child call based on a detected status of the browser.

2. The method as defined in claim 1, wherein the detected status of the browser is an application focus status.

3. The method as defined in claim 1, wherein the detected status of the browser is a status of an active tab of the browser.

4. The method as defined in claim 1, further including monitoring user interaction associated with the monitored device.

5. A tangible machine-readable storage medium comprising instructions which, when executed, cause a machine to at least:
   identify a first HTTP call associated with a browser on a monitored device;
   identify a second HTTP call, the first and second HTTP calls occurring between consecutive user actions on the monitored device;
   in response to identifying at least one of the first HTTP call or the second HTTP call, obtain Page Info data from the browser; and
   determine that (1) the first HTTP call is a parent call if a first universal resource locator of the first HTTP call matches a second universal resource locator (URL) of the Page Info data of the browser, and (2) that the second HTTP call is a child call based on a detected status of the browser.

6. The tangible machine-readable storage medium as defined in claim 5 wherein the detected status of the browser is an application focus status.

7. The tangible machine-readable storage medium as defined in claim 5 wherein the detected status of the browser is a status of an active tab of the browser.

8. The tangible machine-readable storage medium as defined in claim 5 wherein the instructions, when executed, cause the machine to monitor user interaction associated with the monitored device.

9. A method to identify a window in a browser, the method comprising:
   identifying, using a processor, a first HTTP call associated with the browser on a monitored device;
   identifying, using the processor, a second HTTP call, the first and second HTTP calls occurring between consecutive user actions on the monitored device;

determining, using the processor, that (1) the first HTTP call is a parent call if a first universal resource locator (URL) of the first HTTP call matches a second universal resource locator of Page Info data of the browser, and (2) that the second HTTP call is a child call based on a detected status of the browser; and crediting the first URL as having been presented to the user of the monitored device when the first HTTP call is the parent call.

10. A method to identify a window in a browser the method comprising:

identifying, using a processor, a first HTTP call associated with the browser on a monitored device;

identifying, using the processor, a second HTTP call, the first and second HTTP calls occurring between consecutive user actions on the monitored device;

determining, using the processor, that (1) the first HTTP call is a parent call if a first universal resource locator (URL) of the first HTTP call matches a second universal resource locator of Page Info data of the browser, and (2) that the second HTTP call is a child call based on a detected status of the browser; and crediting the first URL with an exposure time corresponding to a time difference between a first timestamp of the first HTTP call and a second timestamp of a third HTTP call, wherein the first HTTP call is a first parent call and the third HTTP call is a second parent call.

11. A tangible machine-readable storage medium comprising instructions which, when executed, cause a machine to at least:

identify a first HTTP call associated with a browser on a monitored device;

identify a second HTTP call, the first and second HTTP calls occurring between consecutive user actions on the monitored device; and determine that (1) the first HTTP call is a parent call if a first universal resource locator of the first HTTP call matches a second universal resource locator (URL) of Page Info data of the browser, and (2) that the second HTTP call is a child call based on a detected status of the browser; and credit the first URL as having been presented to the user of the monitored device when the first HTTP call is the parent call.

12. A tangible machine-readable storage medium comprising instructions which, when executed, cause a machine to at least:

identify a first HTTP call associated with a browser on a monitored device;

identify a second HTTP call, the first and second HTTP calls occurring between consecutive user actions on the monitored device; and determine that (1) the first HTTP call is a parent call if a first universal resource locator of the first HTTP call matches a second universal resource locator (URL) of Page Info data of the browser, and (2) that the second HTTP call is a child call based on a detected status of the browser; and credit the first URL with an exposure time corresponding to a time difference between a first timestamp of the first HTTP call and a second timestamp of a third HTTP call, wherein the first HTTP call is a first parent call and the third HTTP call is a second parent call.

* * * * *

UNITED STATES PATENT AND TRADEMARK OFFICE
CERTIFICATE OF CORRECTION

| | | |
|---|---|---|
| PATENT NO. | : 9,332,056 B2 | Page 1 of 1 |
| APPLICATION NO. | : 13/953176 | |
| DATED | : May 3, 2016 | |
| INVENTOR(S) | : Scott Ross et al. | |

It is certified that error appears in the above-identified patent and that said Letters Patent is hereby corrected as shown below:

In the Claims

Column 19, line 15 (Claim 10): Replace the word "browser" between "a" and "the" with --browser,--.

Signed and Sealed this
Second Day of August, 2016

Michelle K. Lee
*Director of the United States Patent and Trademark Office*